United States Patent
McGhie et al.

(10) Patent No.: US 8,181,863 B1
(45) Date of Patent: *May 22, 2012

(54) CONVERSION OF NON-NEGOTIABLE CREDITS TO NEGOTIABLE FUNDS

(76) Inventors: Sean I. McGhie, Boca Raton, FL (US); Brian K. Buchheit, Davie, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/359,080

(22) Filed: Jan. 26, 2012

Related U.S. Application Data

(63) Continuation of application No. 11/420,255, filed on May 25, 2006, now Pat. No. 7,703,673.

(51) Int. Cl.
*G06K 5/00* (2006.01)
(52) U.S. Cl. ......... 235/380; 235/375; 235/379; 235/487
(58) Field of Classification Search .................. 235/380, 235/375, 379, 487, 486, 382
See application file for complete search history.

(56) References Cited

U.S. PATENT DOCUMENTS

| | | |
|---|---|---|
| 4,607,155 A | 8/1986 | Nao et al. |
| 5,290,033 A | 3/1994 | Bittner et al. |
| 5,397,125 A | 3/1995 | Adams |
| 5,564,546 A | 10/1996 | Molbak et al. |
| 5,609,337 A | 3/1997 | Clapper, Jr. |
| 5,635,696 A | 6/1997 | Dabrowski |
| 5,674,128 A | 10/1997 | Holch et al. |
| 5,689,100 A | 11/1997 | Carrithers |
| 5,761,647 A | 6/1998 | Boushy |
| 5,774,870 A | 6/1998 | Storey |
| 5,779,549 A | 7/1998 | Walker et al. |
| 5,823,874 A | 10/1998 | Adams |
| 5,919,091 A | 7/1999 | Bell et al. |
| 5,935,000 A | 8/1999 | Sanchez, III et al. |
| 5,941,771 A | 8/1999 | Haste, III |
| 5,943,241 A | 8/1999 | Nichols et al. |
| 5,949,042 A | 9/1999 | Dietz, II et al. |
| 5,980,385 A | 11/1999 | Clapper, Jr. |
| 5,993,316 A | 11/1999 | Coyle, Jr. |
| 6,003,013 A | 12/1999 | Boushy et al. |
| 6,015,344 A | 1/2000 | Kelly et al. |
| 6,048,269 A | 4/2000 | Burns et al. |
| 6,098,837 A | 8/2000 | Izawa et al. |
| 6,178,408 B1 | 1/2001 | Copple et al. |
| 6,280,326 B1 | 8/2001 | Saunders |
| 6,280,328 B1 | 8/2001 | Holch et al. |
| 6,289,261 B1 | 9/2001 | Heidel et al. |
| 6,293,867 B1 | 9/2001 | Heidel et al. |
| 6,306,035 B1 | 10/2001 | Kelly et al. |
| 6,311,976 B1 | 11/2001 | Yoseloff et al. |
| 6,315,665 B1 | 11/2001 | Faith |

(Continued)

FOREIGN PATENT DOCUMENTS

WO WO9215174 A1 9/1992

*Primary Examiner* — Edwyn Labaze
(74) *Attorney, Agent, or Firm* — Patents on Demand, P.A.; Brian K. Buchheit

(57) ABSTRACT

Non-negotiable credits can be identified that are from a game associated with an entity with which previous interactions have occurred. The previous interactions can earn the non-negotiable credits. A quantity of the non-negotiable credits can be converted to a quantity of negotiable funds. The converting can be performed by a different legal entity than the entity. Access to the quantity of negotiable funds can be permitted for purchases with at least one vender that does not honor the non-negotiable credits. The identifying, the converting, and the permitting can be performed by computing equipment having at least one processor executing program instructions that are digitally encoded in at least one storage device.

57 Claims, 3 Drawing Sheets

U.S. PATENT DOCUMENTS

| | | |
|---|---|---|
| 6,332,099 B1 | 12/2001 | Heidel et al. |
| 6,352,175 B2 | 3/2002 | Izawa et al. |
| 6,394,907 B1 | 5/2002 | Rowe |
| 6,533,664 B1 | 3/2003 | Crumby |
| 6,554,705 B1 | 4/2003 | Cumbers |
| 6,645,077 B2 | 11/2003 | Rowe |
| 6,648,755 B1 | 11/2003 | Luciano, Jr. et al. |
| 6,685,559 B2 | 2/2004 | Luciano et al. |
| 7,134,959 B2 | 11/2006 | Penrice |
| 7,200,571 B1 | 4/2007 | Jenniges et al. |
| 2001/0044337 A1 | 11/2001 | Rowe et al. |
| 2001/0054003 A1 | 12/2001 | Chien et al. |
| 2002/0020965 A1 | 2/2002 | Potter et al. |
| 2002/0111210 A1 | 8/2002 | Luciano, Jr. et al. |
| 2002/0169021 A1 | 11/2002 | Urie et al. |
| 2002/0198043 A1 | 12/2002 | Chowdhury |
| 2006/0046827 A1 | 3/2006 | Saffari et al. |
| 2006/0052150 A1 | 3/2006 | Hedrick et al. |
| 2007/0167218 A1 | 7/2007 | Rothschild et al. |

CONVERSION OF NON-NEGOTIABLE
CREDITS TO NEGOTIABLE FUNDS

CROSS-REFERENCE TO RELATED
APPLICATIONS

This continuation application claims the benefit of U.S. patent application Ser. No. 11/420,255 filed 25 May 2006 entitled "Web Based Conversion of Non-Negotiable Credits Associated with an Entity to Entity Independent Negotiable Funds." The entire contents of U.S. application Ser. No. 11/420,255 are incorporated by reference herein.

BACKGROUND

The present disclosure relates to the field of fund conversions and, more particularly, to the conversion of non-negotiable credits to negotiable funds.

Entities often reward consumers for utilizing their services with non-negotiable credits, such as frequent flier miles, consumer loyalty points, and entertainment credits. These non-negotiable credits can be applied towards products and/or services provided by a granting entity or its affiliates. For example, consumers can apply frequent flyer credits towards the purchase of airline tickets or airline upgrades. In another example, a consumer can utilize purchase points from a credit card company to receive percentage discounts on goods provided by affiliates. In still another example, entertainment credits can be redeemed for prizes offered in a winnings storefront of an entertainment site.

Many problems are inherent to the current techniques for the redemption of entity provided credits. One such problem is the restriction on usage to goods and/or services of the entity. That is, a consumer may have no need for the products or services listed by the entity for which the non-negotiable credits can be redeemed. Further, additional restrictions and limitations can be placed upon the non-negotiable credits that lessen the usefulness of non-negotiable credits from the consumer's perspective. For instance, airlines often limit the choice of travel dates, known as black-out dates, to which frequent flyer credits can be applied.

Another problem encountered by consumers when redeeming non-negotiable credits is time. Once a consumer submits a request to redeem their non-negotiable credits, the consumer must wait for the entity to perform one or more actions required to fulfill their request. These steps often require days or weeks to complete. For instance, consumers participating in online entertainment sites often are required to wait a minimum of three days for their entertainment credits to be redeemed. Redemption delay can be particularly aggravating to e-commerce consumers, who by nature of an e-commerce marketplace expect rapid responses and immediate consumer gratification.

Time can also be a factor for redeeming credits having an associated expiration date. A consumer's non-negotiable credits may expire before a sufficient quantity is acquired for a desired purchase. Lesser purchases requiring fewer credits may not have a significant appeal for the consumer. Hence, credit expiration dates can further decrease the consumer value of non-negotiable credits.

Yet another problem with conventional implementation of non-negotiable credits is that consumers often belong to multiple credit-earning programs that provide the consumers with multiple incompatible forms of non-negotiable credit. Each of these multiple programs can span a single industry or can span multiple industries. For example, a consumer can acquire a moderate number of frequent flyer miles with multiple airlines, where each airline specific account contains insufficient credits to have any meaningful consumer value. Consumers can also have many different types of non-negotiable credits, such as multiple merchant specific credit, credit card credits, and frequent flier miles, each having different redemption values and program redemption rules. These different programs, values, and rules can understandably confuse and frustrate consumers, who due to their confusion, often elect to avoid participating in an entity sponsored credit program.

BRIEF DESCRIPTION OF THE SEVERAL
VIEWS OF THE DRAWINGS

DETAILED DESCRIPTION

Figure 1:
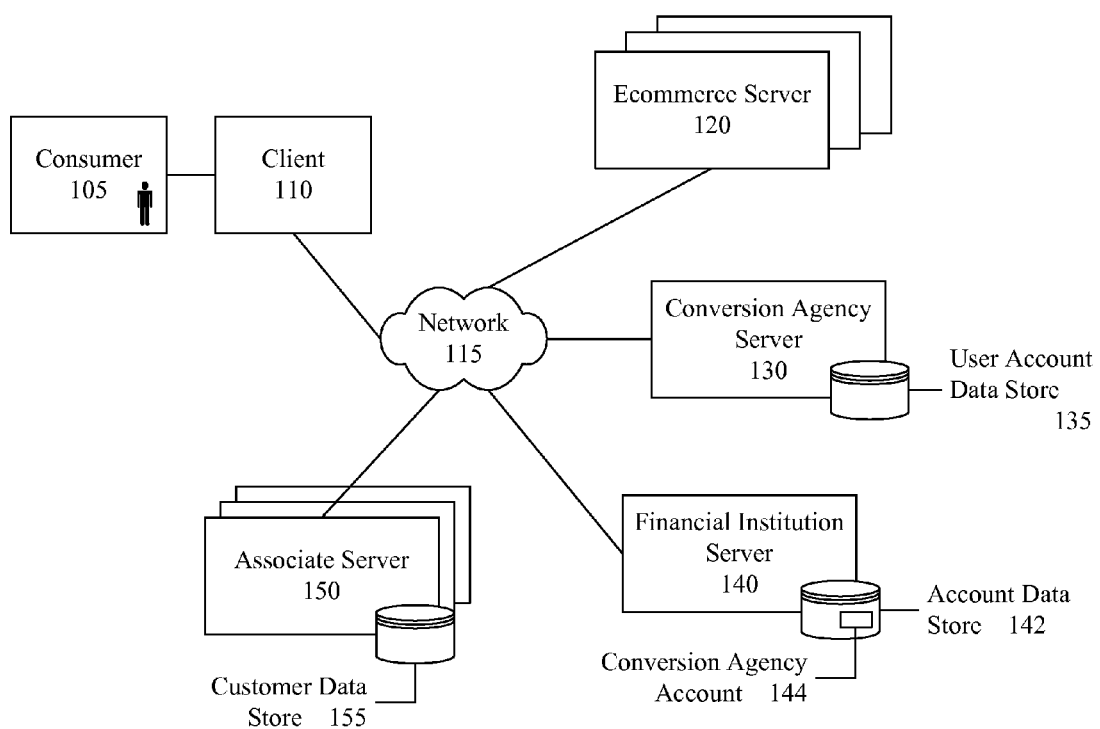
FIG. 1 is a schematic diagram of a Web based conversion of non-negotiable credits associated with an entity to entity independent funds system in accordance with an embodiment of the inventive arrangements disclosed herein.

The present disclosure permits consumers to transform non-negotiable credits provided by an entity to negotiable funds in an approximate immediate fashion using the Web. More specifically, a conversion agency can function as an intermediary that converts entity provided credits into entity independent funds. The conversion agency can be an independent entity that is not directly affiliated with the credit providing entities.

The conversion can occur automatically using a Web initiated action and can have approximately immediate results. Approximately immediate as used herein can signify that a transaction can occur within a single Web session with user acceptable delay tolerances, typically under half an hour and often under a few minutes. In one embodiment, credits can be automatically converted to funds as part of an e-commerce checkout. In another embodiment, credits can be converted into a user accessible account held with a financial institution.

The present disclosure can be implemented in accordance with numerous aspects consistent with material presented herein. For example, one aspect of the present disclosure can include a method for converting credits to funds. The method can include a step of a Web site receiving user identification information. Non-negotiable credits can be identified that are associated with an entity with which the user has previously interacted. The previous interactions could have earned the non-negotiable credits. Responsive to a user request, a conversion agency can convert a quantity of the non-negotiable credits into a quantity of negotiable funds. The conversion agency can be an agency not directly associated with the entity. The user can be permitted to access the quantity of negotiable funds. The quantity of negotiable funds can be applied to user specified purchases. At least a portion of the purchases can involve at least one vender that does not honor the non-negotiable credits.

Another aspect of the present disclosure can include a software method for converting non-negotiable credits into negotiable funds. The method can receive a user request to convert a quantity of non-negotiable credits held in a user account associated with an entity. A conversion rate between the non-negotiable credits available to the user and a form of negotiable funds can be automatically determined. A quantity of non-negotiable credits can be automatically subtracted from the user account. A quantity of the negotiable funds based upon the determined conversion rate and quantity of subtracted funds can be automatically transferred to a financial account. The financial account can be an account that is not associated with the entity. The entire method can occur in an approximately immediate fashion.

Still another aspect of the present disclosure can include a Web-based credit to fund conversion system. The system can include a non-negotiable credit account, a negotiable funds account, and a conversion agency. The non-negotiable credit account can be associated with an entity. Non-negotiable credits contained within the non-negotiable credit account can be earned though previously interactions between a user and the entity. The negotiable funds account can include negotiable funds that the user is able to apply to user specified e-commerce purchases. One or more venders involved in the e-commerce purchases can be venders that do not honor the non-negotiable credits for the e-commerce purchases. The conversion agency can automatically and approximately immediately convert a quantity of credits from the non-negotiable credit account to a quantity of funds in the negotiable funds account responsive to a request from the user.

It should be noted that various aspects of the disclosure can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

FIG. 1 is a schematic diagram of a Web based conversion of non-negotiable credits associated with an entity to entity independent funds system 100 in accordance with an embodiment of the inventive arrangements disclosed herein. System 100 includes consumer 105 and conversion agency server 130.

Consumer 105 interacts with conversion agency server 130 via client 110. Client 110 can be any of a variety of interfaces including, but not limited to, another human being, a personal computer, a kiosk, a graphical user interface (GUI), a Web page, a telephone, a personal data assistant (PDA), a mobile phone, and the like.

Client 110 can operate in a stand-alone fashion. Alternatively, client 110 can be a device that cooperatively participates in a network of distributed computing devices. Client 110 can also be another human being utilizing an alternate form of Client 110 to access conversion agency server 130 via network 115. Network 115 can facilitate data exchanges over wireless as well as line-based communication pathways and protocols.

Both consumer 105 and conversion agency server 130 can interact with associate server 150, e-commerce server 120, and financial institution server 140 via network 115. Conversion agency server 130 includes user account data store 135 in which consumer 105 is a member. Associate server 150 includes customer data store 155 in which consumer 105 is a member. Financial institution server 140 includes account data store 142. Account data store 142 includes conversion agency account 144 corresponding to conversion agency 130.

Consumer 105 earns non-negotiable credits from associate server 150. The quantity of these non-negotiable credits is saved in customer data store 155. The method in which consumer 105 earns credits can be any of a variety of activities including, but not limited to, making online purchases, making in-store purchases, playing online games, participating in online games of chance, participating in surveys, and the like. Consumer 105 uses conversion agency server 130 to convert the non-negotiable credits from associate server 150 into negotiable funds provided by e-commerce server 120 or financial institution 140. In one embodiment, conversion agency 130 can include multiple reward accounts of consumer 105.

For example, consumer 105 earns 500 credits from participating in an online game of chance hosted by associate server 150. Consumer 105 can choose to use conversion agency 130 to convert any or all of these credits to a monetary equivalent. Conversion agency 130 withdraws the necessary amount from conversion agency account 144 contained within the account data store 142 of financial institution 140 and transfers it to an account specified by consumer 105. In another example, consumer 105 uses conversion agency 130 to complete a purchase at e-commerce server 120. Again, conversion agency 130 withdraws the necessary amount from conversion agency account 144 contained within the account data store 142 of financial institution 140 and transfers it to the account of e-commerce server 120.

E-commerce server 120 can be any Web site that supports online purchases of goods or services. In one embodiment, e-commerce server 120 can include a distinct payment option for conversion agency 130. This distinct payment option could process the conversion of credits through their Web site. Alternatively, the distinct payment option could launch an application to process the conversion of credit that is separate from their Web site. In another embodiment, associate server 150 can act as e-commerce server 120.

Financial institution server 140 can be any of a variety of entities including, but not limited to, a bank, a credit card company, an investment firm, and the like. In one embodiment, financial institution server 140 can reside in the same country as consumer 105 and/or associate server 150. In another embodiment, financial institution server 140 can reside in a country other than that of consumer 105 and/or associate server 150.

Figure 2:
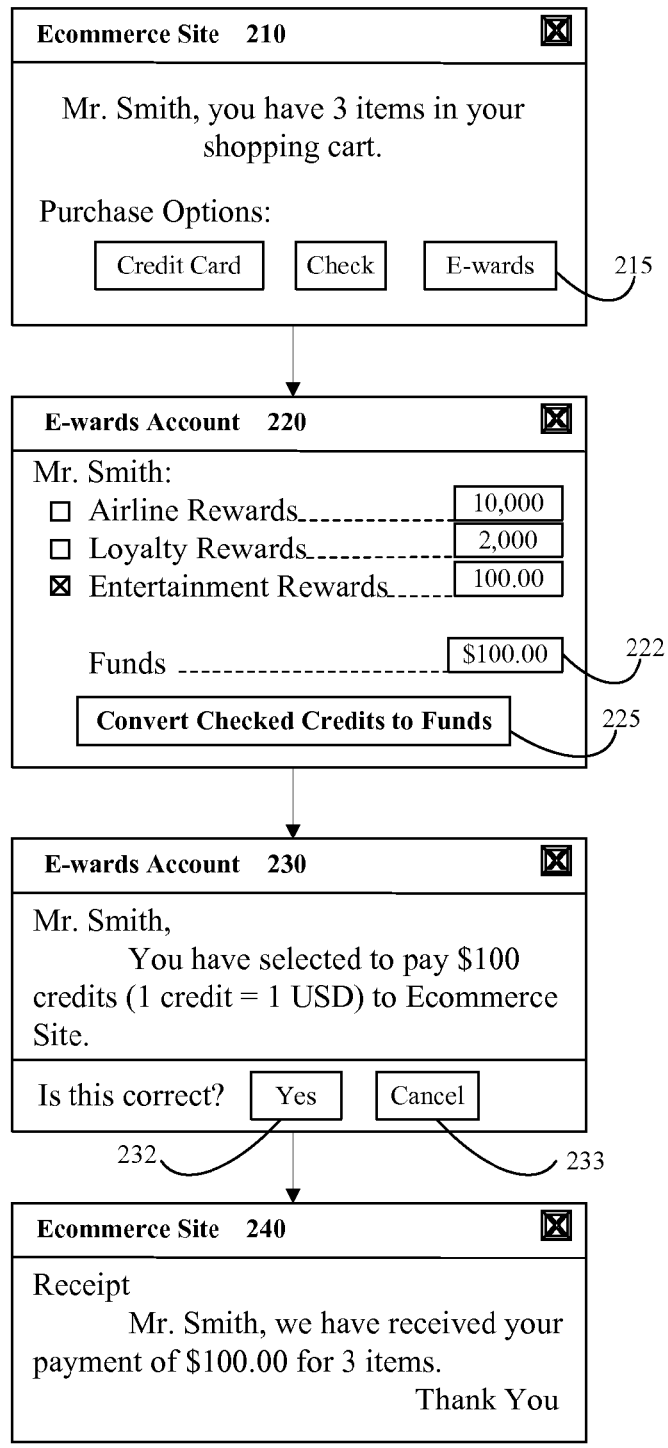
FIG. 2 is a schematic diagram of successive GUIs that illustrate the Web based conversion of non-negotiable credits associated with an entity to entity independent funds system in accordance with an embodiment of the inventive arrangements disclosed herein.

FIG. 2 is a schematic diagram of successive GUIs that illustrate the Web based conversion of non-negotiable credits associated with an entity to entity independent funds system 200 in accordance with an embodiment of the inventive arrangements disclosed herein.

GUI 210 can be a checkout window from any e-commerce site. GUI 210 includes payment button 215. Payment button 215 can represent a payment option that includes the conversion of non-negotiable credits to purchase the items in the shopping cart. Selection of payment button 215 by a user can produce GUI 220.

GUI 220 can be a display window from a conversion agency. GUI 220 includes display box 222 and button 225. GUI 220 can be rendered by any of a variety of means including, but not limited to, a Web browser, a JAVA applet, a PERL script, and the like. In one embodiment, GUI 220 can be contained within the e-commerce site. GUI 220 can display the balance of non-negotiable credits from one or more reward programs. GUI 220 contains a means by which the user selects the type of non-negotiable credits to convert including, but not limited to, a set of radio buttons, a set of checkboxes, a highlighting mechanism, and the like. Display box 222 can display the monetary value of the selected non-negotiable credits. The value displayed in display box 222 can be based on preset conversion factors. Button 225 can represent the initiation of the process by which the selected non-negotiable credits are converted to negotiable funds. Selection of button 225 by a user can produce GUI 230.

GUI 230 can be a display window from a conversion agency. GUI 230 includes yes button 232 and cancel button 233. GUI 230 can be rendered by any of a variety of means including, but not limited to, a Web browser, a JAVA applet, a PERL script, and the like. In one embodiment, GUI 230 can be contained within the e-commerce site. GUI 230 can display a summary message of the transaction initiated by GUI 220. GUI 230 can include a means to continue the transaction, yes button 232, and a means to cancel the transaction, cancel button 233. Selection of cancel button 233 by a user cancels the transaction and can return the user to GUI 220. Selection of yes button 232 by a user completes the transaction initiated in GUI 220 and can produce GUI 240.

GUI 240 can be a display window from the same said e-commerce site. GUI 240 can contain a message acknowledging the successful conversion of the user's non-negotiable credits into negotiable funds for the purchase of the items in the shopping cart.

Figure 3:
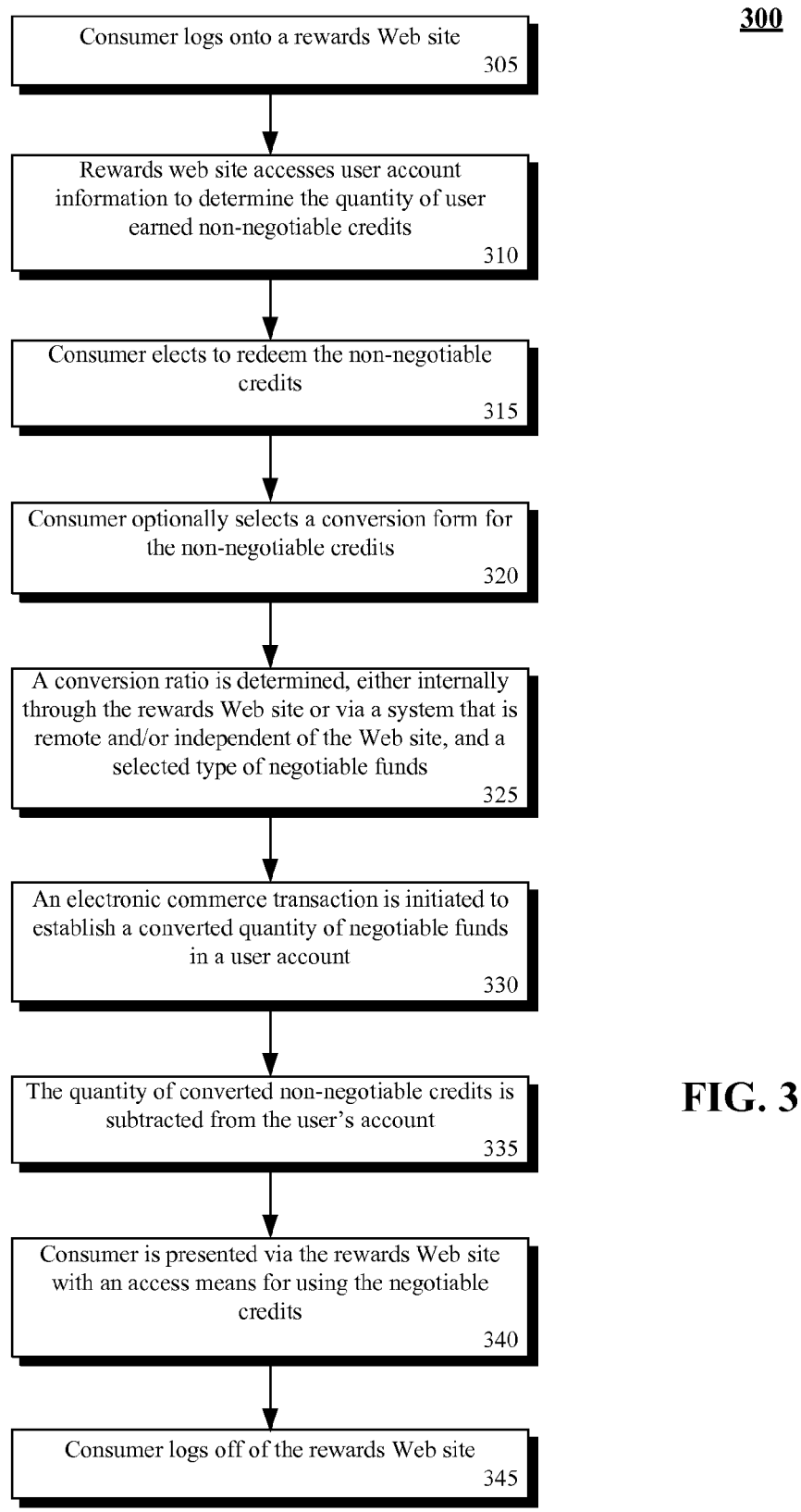
FIG. 3 is a flow chart of a method for the Web based conversion of non-negotiable credits associated with an entity to entity independent funds system in accordance with an embodiment of the inventive arrangements disclosed herein.

FIG. 3 is a flow chart of a method 300 for the Web based conversion of non-negotiable credits associated with an entity to entity independent funds system in accordance with an embodiment of the inventive arrangements disclosed herein.

Method 300 can begin in step 305, where a consumer logs onto a rewards Web site. In step 310, the rewards Web site utilizes the user information provided in step 305 to access the consumer's account information and display the amount of non-negotiable credits in the consumer's account. The consumer elects to redeem some quantity of non-negotiable credits in step 315. If supported by the rewards Web site, step 320 can occur in which the consumer can select the form of negotiable funds to convert the non-negotiable credits. In step 325, a ratio is determined for the conversion of the non-negotiable credits to the selected type of negotiable funds. This ratio can be determined by any of a variety of means including, but not limited to, an algorithm internal to the rewards Web site, an algorithm contained in a system that is remote and/or independent of the rewards Web site, and the like. An electronic commerce transaction is initiated in step 330 to establish the converted amount of negotiable funds in a user account. The quantity of converted non-negotiable credits is subtracted from the user's account in step 335. In step 340, the rewards Web site presents the consumer with an access means for the negotiable funds. Lastly, the consumer terminates the session by logging off the rewards Web site in step 345.

The present disclosure may be realized in hardware, software, or a combination of hardware and software. The present disclosure may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present disclosure also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This disclosure may be embodied in other forms without departing from the spirit or essential attributes thereof. Accordingly, reference should be made to the following claims, rather than to the foregoing specification, as indicating the scope of the disclosure.

What is claimed is:

1. A method comprising:
   identifying non-negotiable credits from a game of chance associated with an entity with which previous interactions have occurred, the previous interactions earning the non-negotiable credits;
   converting a quantity of the non-negotiable credits to a quantity of negotiable funds, wherein the converting is performed by a different legal entity than the entity;
   permitting access to the quantity of negotiable funds for purchases with at least one vender that does not honor the non-negotiable credits, wherein the identifying, the converting, and the permitting are performed by computing equipment having at least one processor executing program instructions that are digitally encoded in at least one storage device, wherein permitting access the quantity of negotiable funds means:
   (a) the entity providing a user with cash, credit, or other negotiable funds, whereby the user is able to thereafter apply the cash, credit, or other negotiable funds to one or more user specified purchases, wherein said purchases comprise the one or more user specified purchases;
   (b) the entity providing the vender with cash, credit, or other negotiable funds, whereby the user is able to purchase goods or services from the vender using the entity provided cash, credit, or other negotiable funds; or
   (c) combinations of (a) and (b).

2. The method of claim 1, wherein the previous interactions are conducted by a user, wherein the user is permitted access to the negotiable funds for purchases with the at least one vender.

3. The method of claim 2, wherein the converting occurs responsive to a user request from the user.

4. The method of claim 1, wherein the different legal entity is a conversion agency not directly associated with the entity.

5. The method of claim 1, wherein the purchases comprise e-commerce purchases.

6. The method of claim 1, wherein the converting further comprises:
   adding the quantity of negotiable funds to an account associated with a financial institution, wherein said account is not an account of the entity.

7. The method of claim 1, wherein the converting further comprises:
   adding the quantity of negotiable funds to a prepaid card account, wherein said prepaid card account is used for the purchases with the at least one vender.

8. The method of claim 1, wherein the non-negotiable credits comprise gambling credits.

9. The method of claim 1, wherein the previously interactions through which the non-negotiable credits are earned occur with a Web site for the entity.

10. The method of claim 1, wherein the entertainment credits are from a gambling game or are from a gambling event.

11. The method of claim 1, wherein the converting and permitting steps occur in an approximately immediate fashion.

12. The method of claim 1, further comprising:
purchasing goods or services from at least one vender that does not honor the non-negotiable credits using the quantity of negotiable funds, wherein the purchasing of goods or services is performed by computing equipment having at least one processor executing program instructions that are digitally encoded in a storage device.

13. A computer program product comprising:
one or more computer-readable, tangible storage devices;
program instructions, stored on at least one of the one or more storage devices, to identify non-negotiable credits from a game of chance associated with an entity with which previous interactions have occurred, the previous interactions earning the non-negotiable credits;
program instructions, stored on at least one of the one or more storage devices, to convert a quantity of the non-negotiable credits to a quantity of negotiable funds, wherein the converting is performed by a different legal entity than the entity; and
program instructions, stored on at least one of the one or more storage devices, to permit access to the quantity of negotiable funds for purchases with at least one vender that does not honor the non-negotiable credits, wherein program instructions to permit access the quantity of negotiable funds means:
(a) program instructions, for execution by one or more processors, causing the entity to provide a user with cash, credit, or other negotiable funds, whereby the user is able to thereafter apply the cash, credit, or other negotiable funds to one or more user specified purchases, wherein said purchases comprise the one or more user specified purchases;
(b) program instructions, for execution by one or more processors, causing the entity to provide the vender with cash, credit, or other negotiable funds, whereby the user is able to purchase goods or services from the vender using the entity provided cash, credit, or other negotiable funds; or
(c) combinations of (a) and (b).

14. The computer program product of claim 13, wherein the non-negotiable credits comprise gambling credits.

15. A method comprising:
initiating a commercial transaction from a point of sale device;
responsive to initiating the commercial transaction, initiating a process to convert a quantity of non-negotiable credits earned by playing a game, said non-negotiable credits being held in an account of an entity providing the game;
responsive to the initiating, determining a conversion rate between the non-negotiable credits and a form of negotiable funds;
responsive to the determining, subtracting a quantity of non-negotiable credits from the account and transferring a quantity of the negotiable funds corresponding to a quantity determined using the conversion rate to a financial account: and
applying a quantity of transferred negotiable funds to the commercial transaction, where the non-negotiable credits are not able to be directly applied to the commercial transaction,
wherein the financial account is not one owned by the entity, wherein the initiating, the determining, the subtracting, and the transferring are performed by computing equipment having at least one processor executing program instructions that are digitally encoded in at least one storage device.

16. The method of claim 15, further comprising:
purchasing goods or services from at least one vender that does not honor the non-negotiable credits, wherein the purchasing of goods or services uses a quantity of transferred negotiable funds.

17. The method of claim 15, wherein the game is a game of chance.

18. The method of claim 15, wherein the initiating, determining, subtracting, and transferring occur in an approximately immediate fashion.

19. The method of claim 15, further comprising:
applying the quantity of transferred negotiable funds to an e-commerce purchase, where the non-negotiable credits are not able to be directly applied to the e-commerce purchase.

20. The method of claim 15, further comprising:
extracting cash from a self-service computing device, wherein the cash is deducted from the transferred quantity of negotiable funds of the financial account.

21. The method of claim 15, wherein the determining of the conversion rate, the subtracting of a quantity of non-negotiable credits, and the transferring of the quantity of negotiable funds is performed by a conversion agency.

22. The method of claim 21, wherein the conversion agency is a different legal entity than the entity.

23. The method of claim 21, wherein the conversion agency is not directly associated with the entity.

24. The method of claim 15, wherein the non-negotiable funds are earned through previous interactions of a user with the entity, said previous interactions earning the non-negotiable credits.

25. A computer program product comprising:
one or more computer-readable, tangible storage devices;
program instructions, stored on at least one of the one or more storage devices, to initiate a commercial transaction from a point of sale device;
program instructions, stored on at least one of the one or more storage devices, to initiate a process to convert a quantity of non-negotiable credits earned by playing a game, said non-negotiable credits being held in an account of an entity providing the game;
program instructions, stored on at least one of the one or more storage devices, to, responsive to the initiating, determine a conversion rate between the non-negotiable credits and a form of negotiable funds;
program instructions, stored on at least one of the one or more storage devices, to, responsive to the determining, subtract a quantity of non-negotiable credits from the account and transfer a quantity of the negotiable funds corresponding to a quantity determined using the conversion rate to a financial account;
program instructions, stored on at least one of the one or more storage devices, to, responsive to the determining, to apply a quantity of transferred negotiable funds to the commercial transaction, where the non-negotiable credits are not able to be directly applied to the commercial transaction, wherein the financial account is not one owned by the entity, wherein the program instructions are able to be executed by at least one processor of computing equipment.

26. The computer program product of claim 25, further comprising:

program instructions, stored on at least one of the one or more storage devices, to purchase goods or services from at least one vender that does not honor the non-negotiable credits, wherein the purchasing of goods or services uses a quantity of transferred negotiable funds.

27. The computer program product of claim 25, further comprising:

program instructions, stored on at least one of the one or more storage devices, to apply a quantity of transferred negotiable funds to an e-commerce purchase, where the non-negotiable credits are not able to be directly applied to the e-commerce purchase.

28. The computer program product of claim 25, further comprising:

program instructions, stored on at least one of the one or more storage devices, to extract cash from a self-service computing device, wherein the cash is deducted from the transferred quantity of negotiable funds of the financial account.

29. A method comprising:

initiating a process to convert a quantity of non-negotiable credits earned by playing a game, said non-negotiable credits being held in an account of an entity providing the game;

responsive to the initiating, determining a conversion rate between the non-negotiable credits and a form of negotiable funds; and responsive to the determining, subtracting a quantity of non-negotiable credits from the account and transferring a quantity of the negotiable funds corresponding to a quantity determined using the conversion rate to a financial account, wherein the financial account is not one owned by the entity, wherein the initiating, the determining, the subtracting, and the transferring are performed by computing equipment having at least one processor executing program instructions that are digitally encoded in at least one storage device, wherein the determining of the conversion rate, the subtracting of a quantity of non-negotiable credits, and the transferring of the quantity of negotiable funds is performed by a conversion agency.

30. The method of claim 29, further comprising:

purchasing goods or services from at least one vender that does not honor the non-negotiable credits, wherein the purchasing of goods or services uses a quantity of transferred negotiable funds.

31. The method of claim 29, wherein the game is a game of chance.

32. The method of claim 29, wherein the initiating, determining, subtracting, and transferring occur in an approximately immediate fashion.

33. The method of claim 29, further comprising:

applying a quantity of transferred negotiable funds to an e-commerce purchase, where the non-negotiable credits are not able to be directly applied to the e-commerce purchase.

34. The method of claim 29, further comprising:

extracting cash from a self-service computing device, wherein the cash is deducted from the transferred quantity of negotiable funds of the financial account.

35. The method of claim 29, further comprising:

initiating a commercial transaction from a point of sale device, wherein the process to convert the non-negotiable credits is initiated responsive to the initiation of the commercial transaction; and applying a quantity of transferred negotiable funds to the commercial transaction, where the non-negotiable credits are not able to be directly applied to the commercial transaction.

36. The method of claim 29, wherein the conversion agency is a different legal entity than the entity.

37. The method of claim 29, wherein the conversion agency is not directly associated with the entity.

38. The method of claim 29, wherein the non-negotiable funds are earned through previous interactions of a user with the entity, said previous interactions earning the non-negotiable credits.

39. A computer program product comprising:

one or more computer-readable, storage devices;

program instructions, stored on at least one of the one or more storage devices, to initiate a process to convert a quantity of non-negotiable credits earned by playing a game, said non-negotiable credits being held in an account of an entity providing the game;

program instructions, stored on at least one of the one or more storage devices, to, responsive to the initiating, determine a conversion rate between the non-negotiable credits and a form of negotiable funds; and program instructions, stored on at least one of the one or more storage devices, to, responsive to the determining, subtract a quantity of non-negotiable credits from the account and transfer a quantity of the negotiable funds corresponding to a quantity determined using the conversion rate to a financial account, wherein the financial account is not one owned by the entity, wherein the program instructions are able to be executed by at least one processor of computing equipment, wherein determining of the conversion rate, subtracting of a quantity of non-negotiable credits, and transferring of the quantity of negotiable funds is performed by a conversion agency.

40. The computer program product of claim 39, further comprising:

program instructions, stored on at least one of the one or more storage devices, to purchase goods or services from at least one vender that does not honor the non-negotiable credits, wherein the purchasing of goods or services uses a quantity of transferred negotiable funds.

41. The computer program product of claim 39, further comprising:

program instructions, stored on at least one of the one or more storage devices, to apply a quantity of transferred negotiable funds to an e-commerce purchase, where the non-negotiable credits are not able to be directly applied to the e-commerce purchase.

42. The computer program product of claim 39, further comprising:

program instructions, stored on at least one of the one or more storage devices, to extract cash from a self-service computing device, wherein the cash is deducted from the transferred quantity of negotiable funds of the financial account.

43. A computer system comprising:
one or more processors, one or more computer-readable memories and one or more computer-readable, storage devices;
program instructions, stored on at least one of the one or more storage devices for execution by at least one of the one or more processors via at least one of the one or more memories, to identify non-negotiable credits from a game of chance associated with an entity with which previous interactions have occurred, the previous interactions earning the non-negotiable credits;
program instructions, stored on at least one of the one or more storage devices for execution by at least one of the one or more processors via at least one of the one or more memories, to convert a quantity of the non-negotiable credits to a quantity of negotiable funds, wherein the converting is performed by a different legal entity than the entity; and
program instructions, stored on at least one of the one or more storage devices for execution by at least one of the one or more processors via at least one of the one or more memories, to permit access to the quantity of negotiable funds for purchases with at least one vender that does not honor the non-negotiable credits, wherein the identifying, the converting, and the permitting are performed by computing equipment having at least one processor executing program instructions that are digitally encoded in at least one storage device, wherein program instructions to permit access the quantity of negotiable funds means:
(a) program instructions, for execution by at least one of the one or more processors, causing the entity to provide a user with cash, credit, or other negotiable funds, whereby the user is able to thereafter apply the cash, credit, or other negotiable funds to one or more user specified purchases, wherein said purchases comprise the one or more user specified purchases;
(b) program instructions, for execution by at least one of the one or more processors, causing the entity to provide the vender with cash, credit, or other negotiable funds, whereby the user is able to purchase goods or services from the vender using the entity provided cash, credit, or other negotiable funds; or
(c) combinations of (a) and (b).

44. The computer system of claim 43, wherein the previous interactions are conducted by a user, wherein the user is permitted access to the negotiable funds for purchases with the at least one vender.

45. The computer system of claim 43, wherein the purchases comprise e-commerce purchases.

46. The computer system of claim 43, wherein the program instructions to convert further comprises:
program instructions to add the quantity of negotiable funds to an account associated with a financial institution, wherein said account is not an account of the entity.

47. The computer system of claim 43, wherein the program instructions to convert further comprises:
program instructions to add the quantity of negotiable funds to a prepaid card account, wherein said prepaid card account is used for the purchases with the at least one vender.

48. The computer system of claim 43, wherein the non-negotiable credits comprise gambling credits.

49. The computer system of claim 43, wherein the previously interactions through which the non-negotiable credits are earned occur with a Web site for the entity.

50. A computer system comprising:
one or more processors, one or more computer-readable memories and one or more computer-readable, storage devices;
program instructions, stored on at least one of the one or more storage devices for execution by at least one of the one or more processors via at least one of the one or more memories, to initiate a commercial transaction from a point of sale device;
program instructions, stored on at least one of the one or more storage devices for execution by at least one of the one or more processors via at least one of the one or more memories, to initiate a process to convert a quantity of non-negotiable credits earned by playing a game, said non-negotiable credits being held in an account of an entity providing the game;
program instructions, stored on at least one of the one or more storage devices for execution by at least one of the one or more processors via at least one of the one or more memories, to, responsive to the initiating, determine a conversion rate between the non-negotiable credits and a form of negotiable funds;
program instructions, stored on at least one of the one or more storage devices for execution by at least one of the one or more processors via at least one of the one or more memories, to, responsive to the determining, subtract a quantity of non-negotiable credits from the account and transfer a quantity of the negotiable funds corresponding to a quantity determined using the conversion rate to a financial account; and
program instructions, stored on at least one of the one or more storage devices for execution by at least one of the one or more processors via at least one of the one or more memories, to, responsive to the determining, to apply a quantity of transferred negotiable funds to the commercial transaction, where the non-negotiable credits are not able to be directly applied to the commercial transaction, wherein the financial account is not one owned by the entity, wherein the program instructions are able to be executed by at least one processor of computing equipment.

51. The computer system of claim 50, further comprising:
program instructions, stored on at least one of the one or more storage devices for execution by at least one of the one or more processors via at least one of the one or more memories, to purchase goods or services from at least one vender that does not honor the non-negotiable credits, wherein the purchasing of goods or services uses a quantity of transferred negotiable funds.

52. The computer system of claim 50, further comprising:
program instructions, stored on at least one of the one or more storage devices for execution by at least one of the one or more processors via at least one of the one or more memories, to apply a quantity of transferred negotiable funds to an e-commerce purchase, where the non-negotiable credits are not able to be directly applied to the e-commerce purchase.

53. The computer system of claim 50, further comprising:
program instructions, stored on at least one of the one or more storage devices for execution by at least one of the one or more processors via at least one of the one or more memories, to extract cash from a self-service computing device, wherein the cash is deducted from the transferred quantity of negotiable funds of the financial account.

54. A computer system comprising:

one or more processors, one or more computer-readable memories and one or more computer-readable, storage devices;

program instructions, stored on at least one of the one or more storage devices for execution by at least one of the one or more processors via at least one of the one or more memories, to initiate a process to convert a quantity of non-negotiable credits earned by playing a game, said non-negotiable credits being held in an account of an entity providing the game;

program instructions, stored on at least one of the one or more storage devices for execution by at least one of the one or more processors via at least one of the one or more memories, to, responsive to the initiating, determine a conversion rate between the non-negotiable credits and a form of negotiable funds; and program instructions, stored on at least one of the one or more storage devices for execution by at least one of the one or more processors via at least one of the one or more memories, to, responsive to the determining, subtract a quantity of non-negotiable credits from the account and transfer a quantity of the negotiable funds corresponding to a quantity determined using the conversion rate to a financial account, wherein the financial account is not one owned by the entity, wherein the program instructions are able to be executed by at least one processor of computing equipment, wherein determining of the conversion rate, subtracting of a quantity of non-negotiable credits, and transferring of the quantity of negotiable funds is performed by a conversion agency.

55. The computer system of claim 54, further comprising:

program instructions, stored on at least one of the one or more storage devices, to purchase goods or services from at least one vender that does not honor the non-negotiable credits, wherein the purchasing of goods or services uses a quantity of transferred negotiable funds.

56. The computer system of claim 54, further comprising:

program instructions, stored on at least one of the one or more storage devices, to apply a quantity of transferred negotiable funds to an e-commerce purchase, where the non-negotiable credits are not able to be directly applied to the e-commerce purchase.

57. The computer system of claim 54, further comprising:

program instructions, stored on at least one of the one or more storage devices, to extract cash from a self-service computing device, wherein the cash is deducted from the transferred quantity of negotiable funds of the financial account.

* * * * *

UNITED STATES PATENT AND TRADEMARK OFFICE
CERTIFICATE OF CORRECTION

PATENT NO. : 8,181,863 B1  
APPLICATION NO. : 13/359080  
DATED : May 22, 2012  
INVENTOR(S) : Sean I. McGhie and Brian K. Buchheit Page 1 of 1

It is certified that error appears in the above-identified patent and that said Letters Patent is hereby corrected as shown below:

On the Title Page, Item (63)

In the RELATED U.S. APPLICATION DATA the words: "continuation of Application No. 11/420,255, filed on May 25, 2006, now Pat. No. 7,703,673"

should be replaced with: "continuation of Application No. 11/420,255, filed on May 25, 2006, now Pat. No. 7,703,673, and a continuation of Application No. 12/720,743, filed on March 10, 2010, now Pat. No. 8,123,127, and a continuation of Application No. 12/759,506, filed on April 13, 2010, now Pat. No. 8,162,209, and a continuation of Application No. 13/168,814, filed on June 24, 2011, now Pat. No. 8,376,224."

In the Specification

Column 1, lines 7-12

In the CROSS-REFERENCE TO RELATED APPLICATIONS the words: "This continuation application claims the benefit of U.S. patent Ser. No. 11/420,255 filed May 2006 entitled "Web Based Conversion of Non-Negotiable Credits Associated with an Entity to Entity Independent Negotiable Funds". The entire contents of U.S. Application Ser. No. 11/420,255 are incorporated by reference herein."

should be replaced with: "This continuation application claims the benefit of U.S. patent Ser. No. 11/420,255 filed May 2006 entitled "Web Based Conversion of Non-Negotiable Credits Associated with an Entity to Entity Independent Negotiable Funds", now Pat. No. 7,703,673. Priority to Pat. No. 7,703,673 is through Pat. No. 7,123,127 (filed March 10, 2010 and issued Feb 28, 2012) and/or Pat. No. 8,162,209 (filed April 13, 2010 and issued April 24, 2012) and Pat. No. 8,876,224 (filed June 24, 2011 and issued February 19, 2013, which claims priority to Patent No. 7,703,673 through Pat. No. 7,123,127 and Pat. No 8,162,209). The entire contents of U.S. Application Ser. No. 11/420,255 are incorporated by reference herein."

Signed and Sealed this  
Eighteenth Day of November, 2014

Michelle K. Lee  
*Deputy Director of the United States Patent and Trademark Office*